United States Patent
Ahmad (10) Patent No.: US 7,853,265 B1
(45) Date of Patent: Dec. 14, 2010

(54) BROADBAND WIRELESS ROUTER-ARCHITECTURE ENHANCEMENTS FOR VOIP

(75) Inventor: Mirza Kaleem Ahmad, Chantilly, VA (US)

(73) Assignee: Nextel Communications Inc., Reston, VA (US)

( * ) Notice: Subject to any disclaimer, the term of this patent is extended or adjusted under 35 U.S.C. 154(b) by 1102 days.

(21) Appl. No.: 11/409,064

(22) Filed: Apr. 24, 2006

Related U.S. Application Data (63) Continuation of application No. 11/220,579, filed on Sep. 8, 2005, now abandoned.

(60) Provisional application No. 60/608,122, filed on Sep. 9, 2004.

(51) Int. Cl.
*H04W 72/00* (2009.01)

(52) U.S. Cl. .................. 455/453; 455/435.3; 455/452.1; 370/329; 370/395.1; 370/395.41

(58) Field of Classification Search .................. 455/453, 455/435.3, 450, 452.1, 452.2, 406; 370/329, 370/395.1, 395.41
See application file for complete search history.

(56) References Cited

U.S. PATENT DOCUMENTS

| | | | |
|---|---|---|---|
| 6,490,249 B1 | 12/2002 | Aboul-Magd et al. | |
| 6,904,017 B1 | 6/2005 | Meempat et al. | |
| 2004/0198237 A1* | 10/2004 | Abutaleb et al. | 455/78 |

OTHER PUBLICATIONS

International Search Report for PCT/US05/32356 dated Apr. 19, 2006.
Written Opinion for PCT/US05/32356 dated Apr. 19, 2006.

* cited by examiner

*Primary Examiner*—Temica M Beamer (57) ABSTRACT

A method for providing enhanced service in an IP-based core network having a collapsed wireless system architecture comprises using a modified proxy-call session control function in a broadband wireless router to monitor the IP-based core network and, based on the amount of available resources, either accepting a call or rejecting the call into the network. Additionally, depending on an amount of available resources in the IP-based core network a quality of a call-in-progress or a user application may be adjusted.

20 Claims, 7 Drawing Sheets

BROADBAND WIRELESS ROUTER-ARCHITECTURE ENHANCEMENTS FOR VOIP

CROSS-REFERENCE TO RELATED APPLICATION

This is a continuation of U.S. patent application Ser. No. 11/220,579, filed on Sep. 8, 2005, which claims priority to U.S. Provisional Application No. 60/608,122, filed Sep. 9, 2004, for Broadband Wireles Router—Architecture Enhancements for VoIP, the entire disclosure of these applications is herein expressly incorporated by reference.

BACKGROUND OF THE INVENTION

Unlike traditional wireless system architectures which employ proprietary inter-network protocol and signalling, newer wireless systems are implementing an all-IP based core network using a "collapsed" architecture. For example, the collapsed architecture may combine the various components in the UMTS packet domain architecture or the CDMA packet domain architecture into a single network element, for example the broadband wireless router (BWR).

The BWR may incorporate the various functional components in the UMTS architecture, for example, Node B, radio network controller (RNC) serving general packet radio service (GPRS) support node (SGSN) function, and a home location register (HLR). Similarly, in the CDMA 2000 architecture, the BWR may incorporate a base station (BTS), base station controller (BSC), packet data serving node (PDSN) functions, as well as an Authentication Authorization Accounting (AAA) server. For example, Flarion Technologies Inc.'s Flash OFDM system uses a Flarion Radio Router to provide a collapsed architecture for an all-IP based network.

Compared to traditional wireless system architecture, the collapsed architecture model is more simplistic because it hides the various interfaces between different functions and provides visibility at the IP layer for the radio access network (RAN) for effective traffic conditioning and Quality of Service (QoS) control. However, to support voice over IP (VoIP) and multi-media services, additional functionality is needed in the collapsed model to accommodate call admission control and seamless voice and multimedia call handoff.

A simplistic approach for call admission control is "call counting". In this approach, the broadband wireless router keeps track of the count of the calls in progress. This is adequate for networks in which only voice services are being offered. However, if Session Initiated Protocol ("SIP") based multimedia services are being offered in addition to the VoIP services, merely keeping track of call count is not sufficient for effective and efficient call admission control. Other more comprehensive methods are needed to augment functionality. The call counting approach also assumes that any bottleneck is at the radio access layer, while the backhaul and the core network are considered as over-provisioned. Moreover, the call counting approach assumes that the softswitch and media gateways are not a limiting factor. These assumptions may not be true in a large-scale network, and may not be cost effective.

For example, one call counting method consists of counting until the number of calls being admitted reaches the maximum number of calls (N) that the radio router can handle, then denying new requests. A new call can only be admitted when one of the ongoing N calls terminates. Furthermore, this approach lacks the end-to-end visibility to the condition of the call or session path. Using the call counting approach, a new call can easily be admitted on the originating radio router but rejected by the terminating radio router.

Such an approach can be further improved by setting the counter dynamically taking into account the available bandwidth and the bandwidth requirements of the new session or call being presented to the system.

SUMMARY OF THE INVENTION

One aspect of the present invention is to enable call admission control based on the amount of resources available in a communication network.

Another aspect of the present invention is to enable call quality control based on the amount of resources available in a communication network.

In accordance with exemplary embodiments of the present invention, a method for providing enhanced service in an IP-based core network having a collapsed wireless system architecture comprises the acts of modifying a proxy-call session control function in a broadband wireless router, monitoring the IP-based core network using the modified proxy call session control function to determine an amount of available resources in the IP-based core network, and, based on the amount of available resources, either accepting a call or rejecting the call into the network.

According to another aspect of the present invention, a method for providing enhanced service in an IP-based core network having a collapsed wireless system architecture comprises the acts of modifying a proxy-call session control function in a broadband wireless router, monitoring the IP-based core network using the modified proxy call session control function to determine an amount of available resources in the IP-based core network, and adjusting a quality of at least one call-in-progress based on an amount of available resources in the IP-based core network.

According to an additional aspect of the present invention, a method for providing enhanced service in an IP-based core network having a collapsed wireless system architecture for implementing mobile-to-mobile wireless communications comprises the acts of modifying a proxy-call session control function on at least a first broadband wireless router, monitoring the IP-based core network using the modified proxy call session control function at the first broadband wireless router to determine an amount of available resources in the IP-based core network at the first broadband wireless router, and based on the amount of available resources at the first broadband wireless router either accepting a call or rejecting the call into the network.

According to a further aspect of the present invention, a method for providing enhanced service in an IP-based core network having a collapsed wireless system architecture for implementing mobile-to-public switched telephone network wireless communications comprises the acts of modifying proxy-call session control function on a broadband wireless router, monitoring the IP-based core network using the modified proxy call session control function at the broadband wireless router to determine an amount of available resources in the IP-based core network, and § based on the amount of available resources at the broadband wireless router either accepting a call or rejecting the call into the network, wherein determining whether to accept or reject the call includes determining whether to establish a communication gateway between the IP-based core network and the public switched telephone network.

According to another aspect of the present invention, a system for providing enhanced service in a collapsed wireless system architecture implementing mobile-to-mobile wireless communications comprises means for implementing a modified proxy-call session control function on a first broadband wireless router, means for monitoring the IP-based core network using the modified proxy-call session control function at the first broadband wireless router to determine an amount of available resources in the IP-based core network, and means for, based on the amount of available resources at the first broadband wireless router, either accepting a call or rejecting the call into the network.

According to an additional aspect of the present invention, a system for providing enhanced service in a collapsed wireless system architecture comprises means for implementing a modified proxy-call session control function on a broadband wireless router, means for monitoring the IP-based core network using the modified proxy call session control function to determine an amount of available resources in the IP-based core network, and means for adjusting a quality of at east one call-in-progress within the IP-based core network.

According to a further aspect of the present invention, a system for providing enhanced service in a collapsed wireless system architecture implementing mobile-to-mobile wireless communications comprises means for implementing a modified proxy-call session control function on a first broadband wireless router, means for monitoring the IP-based core network using the modified proxy-call session control function at the first broadband wireless router to determine an amount of available resources in the IP-based core network, and means for, based on the amount of available resources at the first broadband wireless router, either accepting a call or rejecting the call into the network.

According to a further aspect of the present invention, a system for providing enhanced service in a collapsed wireless system architecture implementing mobile-to-public switched telephone network wireless communications comprises means for implementing a modified proxy-call session control function on a first broadband wireless router, means for monitoring the IP-based core network using the modified proxy-call session control function at the first broadband wireless router to determine an amount of available resources in the IP-based core network, and means for, based on the amount of available resources at the first broadband wireless router, either accepting a call or rejecting the call into the network.

In accordance with exemplary embodiments of the present invention, a broadband wireless router implements a modified version of Proxy-Call Session Control Function ("P-CSCF") in an all-IP based core network. Specifically, the broadband wireless router, which may be integrated with the modified P-CSCF implements call admission control by tracking calls in progress in the network and the bandwidth requirement for the voice and multimedia calls. Furthermore, the broadband wireless router takes into account the physical bandwidth available on a backhaul link within the network. In accordance with an exemplary embodiment of the present invention, negotiation capabilities between the broadband wireless router (as the edge device of the network) and various user applications can be provided. The negotiation capabilities allow the user application to adjust its bandwidth and quality of service ("QoS") requirements according to what the network can offer.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
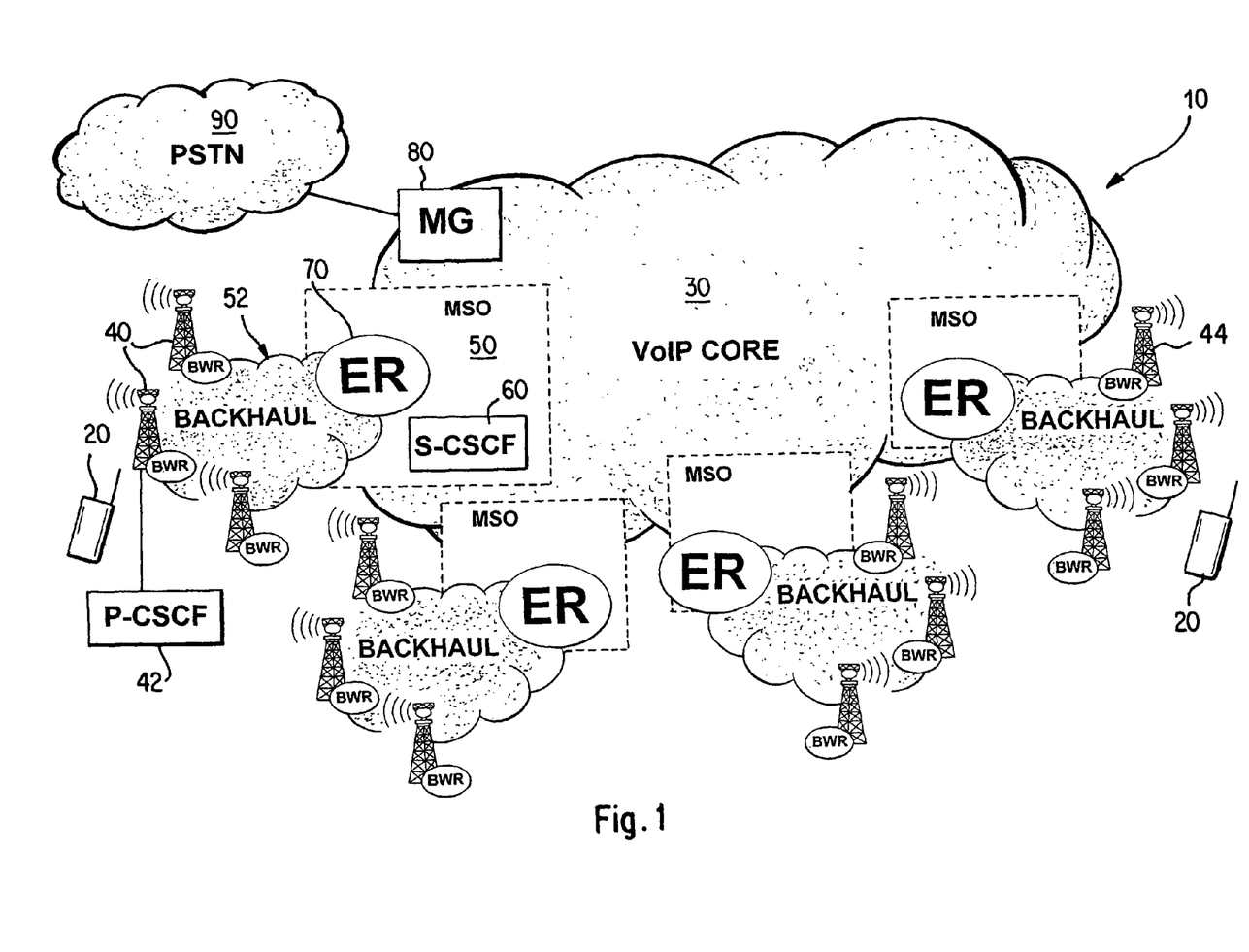
FIG. 1 is a block diagram of an exemplary all-IP based core wireless network using a collapsed architecture in accordance with one embodiment of the present invention.

FIG. 1 illustrates an exemplary communications system 10 for implementing call admissions and call quality control for a user 20 in an all-IP based core network 30. The network 30 utilizes broadband wireless base station routers ("BWRs") 40 (situated as various base stations), which generally control communications between the user 20 and the network 30. In a mobile-to-mobile scenario, BWR 40 may be designated as a sending BWR, which initiates a communication session with a receiving BWR 44. Communications system 10 may also includes mobile switching offices ("MSOs") 50, backhaul links 52, Serving Call Session Control Function ("S-CSCF") 60, and edge routers 70. Communications system 10 may further include media gateways 80, and a public switched telephone network ("PSTN") 90, where media gateway 80 provides an interface between the VoIP network 30 and PSTN 90. It should be noted that although a particular number and configuration of elements is illustrated in FIG. 1, the present invention also envisions and encompasses alternative arrangements and numbers of the various components of communications system 10.

In one embodiment of the present invention, the various BWRs 40 are integrated with a modified Proxy Call Session Control Function "(P-CSCF") 42. P-CSCF 42 is an IP multimedia subsystem element that identifies the first contact point within network 30 for user 20. Implementing the modified P-CSCF 42 with a BWR 40 provides greater visibility at a base station of how much bandwidth is integrated through the backhaul link 52, as well as what kind of resources are available on the base station itself. The backhaul link 52 provides connectivity between the various BWRs 40 and MSO 50. In another embodiment of the present invention, P-CSCF 42 may be implemented separately from the BWRs 42.

Figure 2:
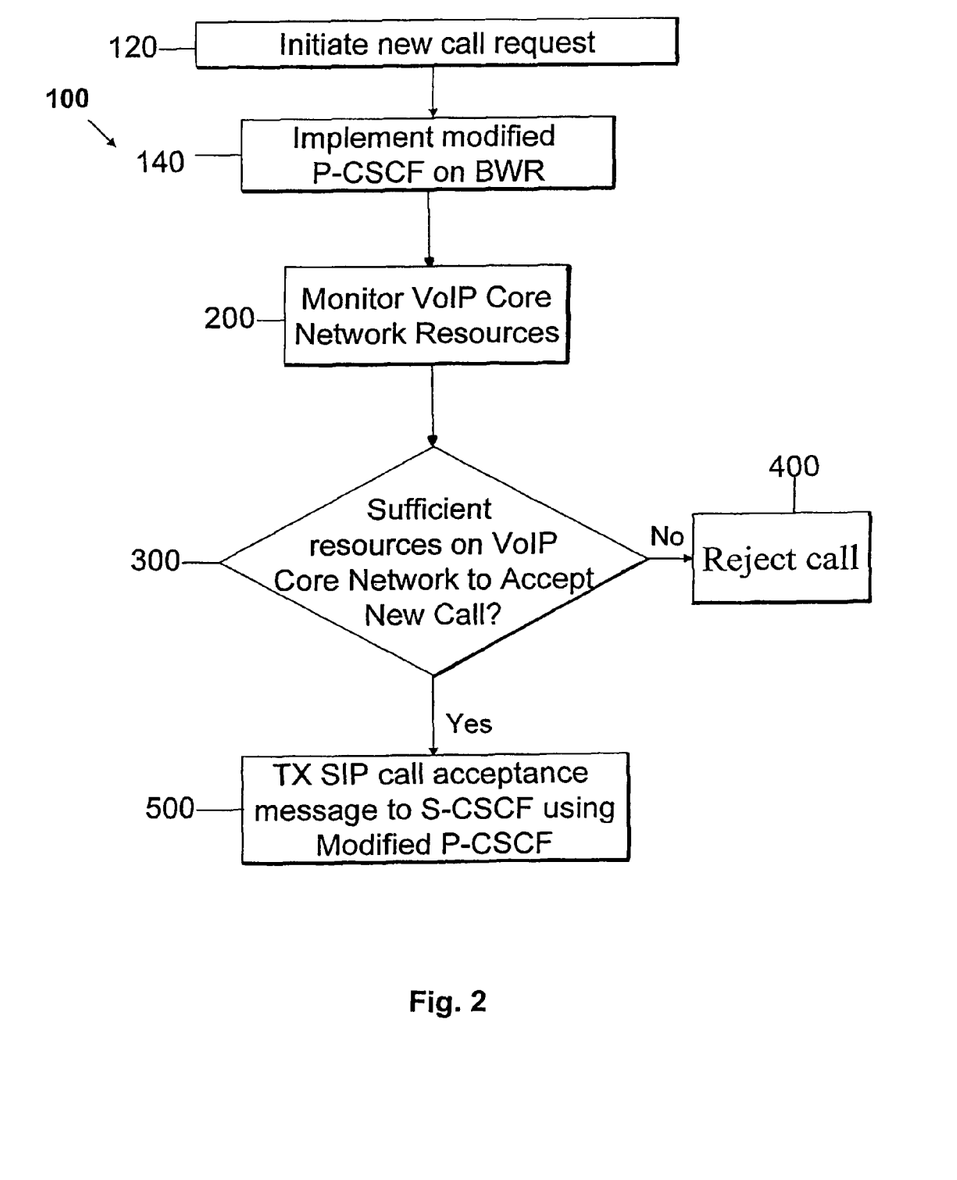
FIG. 2 is a flow diagram of an exemplary method for implementing a call admission control process in accordance with one embodiment of the present invention.

FIG. 2 illustrates an exemplary method for implementing a call admission control process in communications system 10 using a BWR 40 that implements a modified P-CSCF 42. Integrating modified P-CSCF 42 with a BWR 40 provides visibility into the state of resources at BWR 40 from the perspective of, for example, how many calls are in progress at that BWR 40 and how much bandwidth is available in the backhaul link 52 associated with that BWR 40. Whether or not a call from a user 20 is accepted by the BWR 40 depends on the resources available to the BWR 40.

P-CSCF is essentially a SIP proxy, which functions as the initial point of contact between the user 20 and an IP Multimedia Subsystem ("IMS"), which enables the support for IP multimedia applications within the UMTS system. It is also the first point of contact for the user 20 in a visited network for registration and initiating a VoIP call using SIP. P-CSCF performs tasks such as routing SIP messages to an Interrogating Call Session Control Function ("I-CSCF"), which is an IMS element that provides a contact point within an operator's network, allows subscribers of the network operator, or roaming subscribers to register, and deals will registration, routing and forwarding of SIP messages and billing for service. Likewise, P-CSCF routes SIP messages to S-CSCF, as well as authorizing QoS to mobiles and logging and monitoring for billing purposes.

The IMS framework specifies Common Open Policy Service ("COPS"), an Internet Engineering Task Force ("IETF") standard for exchanging policy information in a network, as a protocol between Policy Decision Function (PDF) and the Gateway GPRS Support Node ("GGSN"), which supports the edge routing function of the GPRS network in 3GPP architecture. In this case the GGSN acts as the Policy Enforcement Point (PEP). In 3GPP release 5 specification the PDF can either be collocated with the P-CSCF or implemented as separate standalone element. In 3GPP Release 6 the P-CSCF and the PDF are separate with a standardized interface. The QoS authorization in the UMTS/3GPP and CDMA/3GPP2 architectures is implemented by P-CSCF looking into the service data point ("SDP") information in the SIP messages and subsequently talking to the PDF.

This cumbersome framework is eliminated in the collapsed architecture of the present invention. Furthermore, the standardized architecture is less efficient due to additional functional entities and message exchange between these entities. In the integrated P-CSCF approach, as the P-CSCF resides on the BWR 40 and the BWR 40 is aware of the current state of resources in communications system 10, the collapsed architecture can accomplish effective call admission control and seamless voice and multimedia handoff.

Call admission control method 100 begins when a user 20 initiates a new call request to a BWR 40 (step 120). BWR 40 directly implements modified P-CSCF 42 (step 140). In another embodiment a standard, standalone P-CSCF function may be used in conjunction with BWR 40 to implement the necessary session initiation protocol ("SIP") hooks and messages capability on the BWR 40. In this embodiment, the P-CSCF function resides on a separate device and there is a communication link provided between the BWR 40 and the device hosting the P-CSCF function.

BWR 40 monitors the resources available to it within network 30 (step 200) and then determines whether there are sufficient resources available to accept the new call request (step 300). If there are not sufficient resources available, the new call request is rejected (step 400). If there are sufficient resources available, the new call request is accepted by the modified P-CSCF 42, thus sending a standard SIP call admission control ("CAC") message to the S-CSCF 50 residing at the local MSO 50 (step 500). The SIP message indicates that the new call is accepted and the call then progresses as is customary in wireless communication networks.

Figure 3:
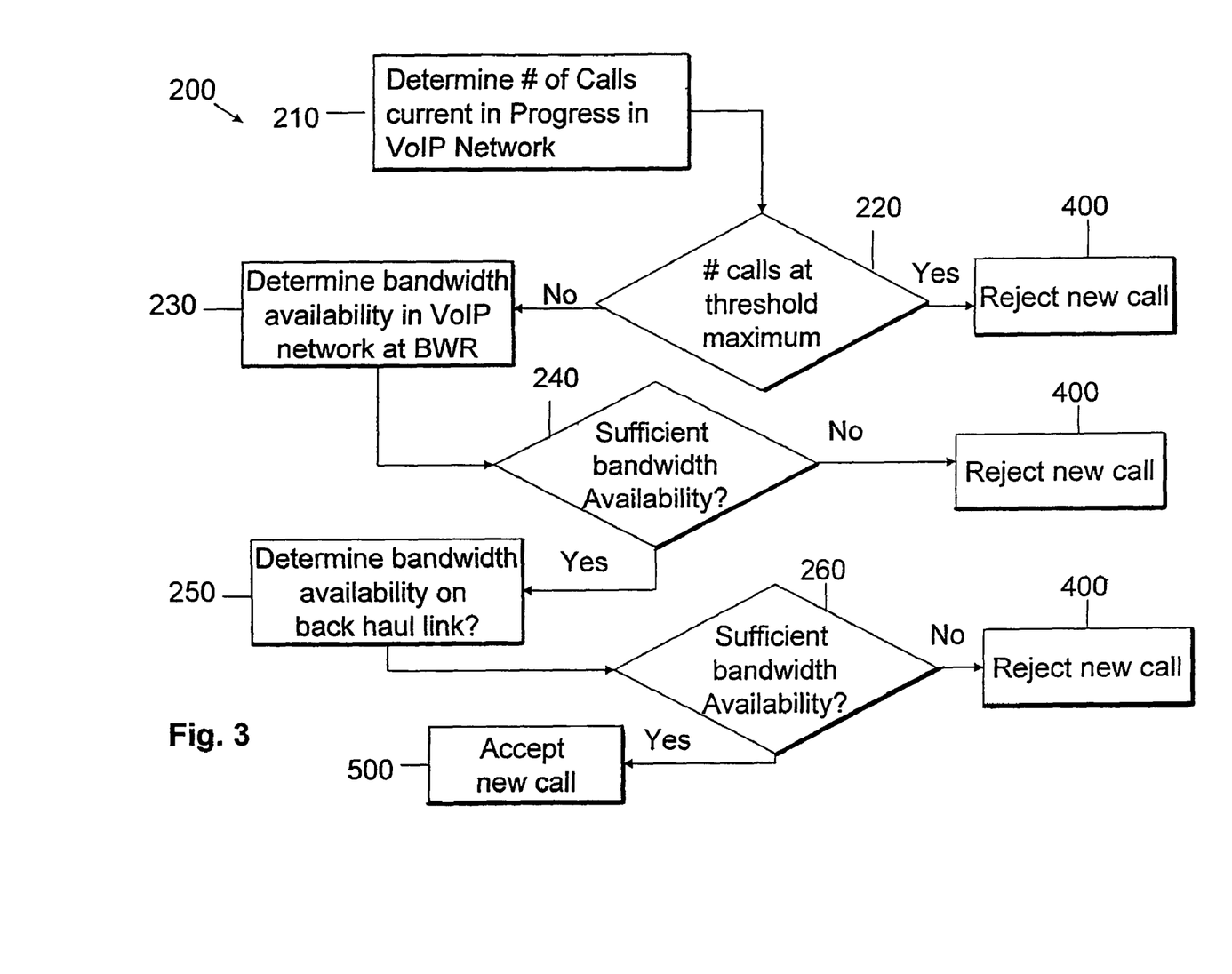
FIG. 3 is a flow diagram of an exemplary method for monitoring resources in an all-IP based core wireless network in accordance with one embodiment of the present invention.

FIG. 3 illustrates an exemplary method for monitoring resources in network 30 at BWR 40. The amount of available resources depends on the number of calls currently in progress in network 30 and the amount of bandwidth available—both within network 30 and at the backhaul link 52 associated with the BWR 40. Network resource monitoring method 200 begins with BWR 40 determining the number of calls in progress at that time within network 30 (step 210) and determining whether the number of calls is at, or above, a defined threshold maximum (step 220). The level of the threshold maximum depends on the resource capabilities of network 30.

If the number of calls is at or above the threshold maximum, the new call request is rejected (step 400). If, however, the number of calls is below the threshold maximum, BWR 40 then determines the amount of bandwidth then available within network 30 (step 230) and determines whether the amount of available bandwidth is sufficient to allow acceptance of the new call request (step 240). If the amount of available bandwidth within network 30 is not sufficient, the new call request is also rejected (step 400).

If there is sufficient available bandwidth within network 30, BWR 40 then determines the amount of available bandwidth at the associate backhaul link 52 (step 250) and determines whether the amount of available bandwidth is sufficient to allow acceptance of the new call request (step 260). If, however, the amount of available bandwidth within backhaul link 52 is not sufficient, the new call request is rejected (step 400). If there is a sufficient amount of available bandwidth, the new call is accepted as described previously (step 500). It should be noted that the order of the steps the of network resource monitoring method 200 indicated in FIG. 3 is merely illustrative, and the present invention envisions and encompasses alternative orderings of the steps.

Figure 4:
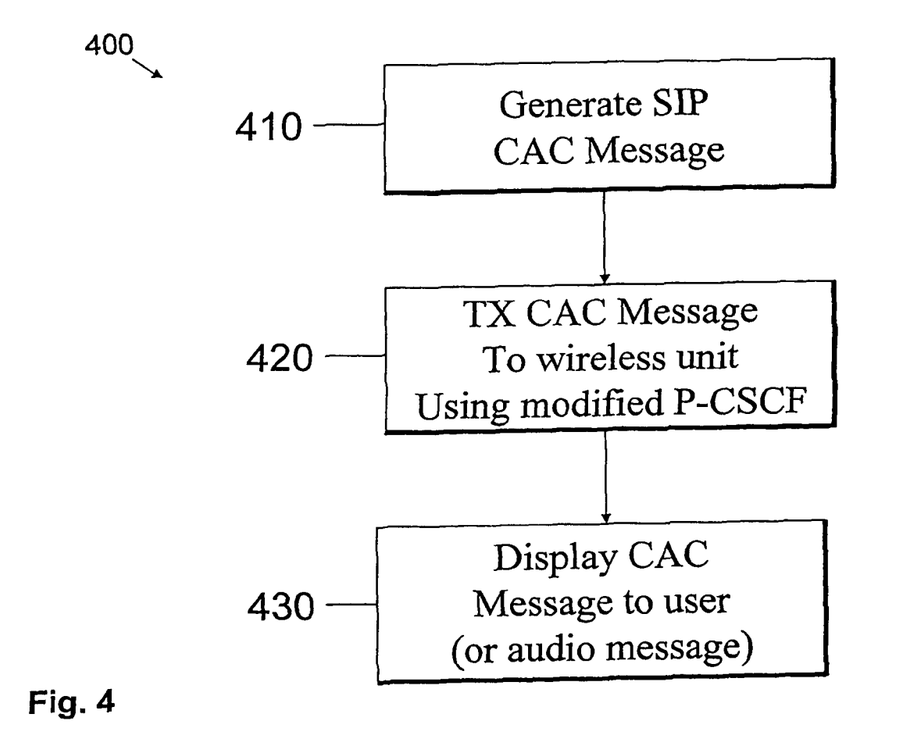
FIG. 4 is a flow diagram of an exemplary method for implementing call admission control to reject new call requests in an all-IP based core wireless network in accordance with one embodiment of the present invention.

FIG. 4 illustrates a call admission control process to reject new call requests. call request rejection method 400 is implemented when a new call request must be rejected due to lack of sufficient network resources. Modified P-CSCF 42 generates a standard SIP CAC message (step 410). The SIP CAC message is transmitted to the user's wireless unit 20 using modified P-CSCF 42 (step 420). In one embodiment, the SIP CAC message may be displayed to the user 20 on the wireless unit—visually and/or using an audio message, the text of the message indicating that the new call request had been rejected (step 430).

Integrating modified P-CSCF 42 on BWR 40 also provides an improved method of implementing call quality of service ("QoS") control for calls within network 30. The integration creates negotiation capabilities between the BWR 40 and an application being used by user 20 (e.g., a call, WAP access, etc.) whereby the application can adjust its bandwidth and QoS requirement according to what the network can offer. This advantageously allows a network operator and/or a customer to charge a premium price for increased QoS, while offering discounts when the QoS must be downgraded to maintain the application on the network 30.

Figure 5:
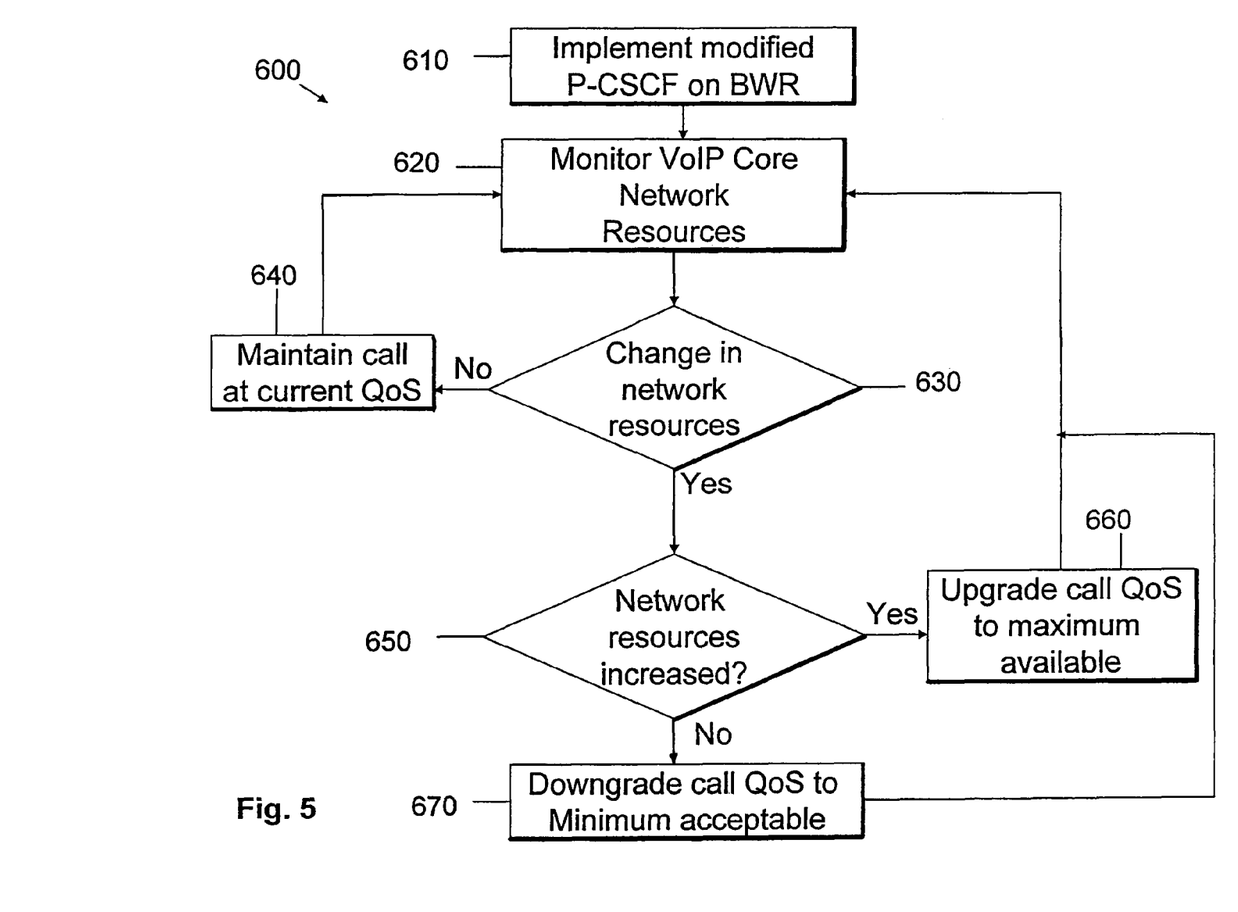
FIG. 5 is a flow diagram of an exemplary method for implementing a call quality control process in accordance with one embodiment of the present invention.

FIG. 5 illustrates an exemplary method for implementing a call quality control process within network 30 using a BWR 40 integrated with a modified P-CSCF 42. In call QoS control method 600, the modified P-CSCF 42 is implemented on the BWR 40 as described previously (step 610). Again, the BWR 40 monitors the resource availability of network 30 (step 620) to determine whether there is a change in available network recourses that might affect any applications being implemented within network 30 (step 630). If there is no change, any current application may be maintained at its then current QoS level (step 640).

If, however, there is a change in available network resources, BWR 40 then determines whether the available network resources have increased or decreased (step 650). If the available network resources have increased, BWR 40 may upgrade the QoS of one or more applications which the BWR 40 is then currently implementing, up to the maximum available QoS allowed by the new level of available network resources (step 660).

Likewise, if the available network resources have decreased, BWR 40 may downgrade the QoS of one or more applications to preserve them on the network 30 to a minimum acceptable level for that particular user's 20 service plan (step 670). A higher price may be charged for increased QoS while a lower price may be charged for the period of time in which an application's QoS is downgraded. The P-CSCF 42 on the BWR 40 uses SIP messaging to control the upgrading or downgrading of an application's QoS by sending the appropriate SIP message to the S-CSCF of the MSO 50 associated with the BWR 40.

Figure 6:
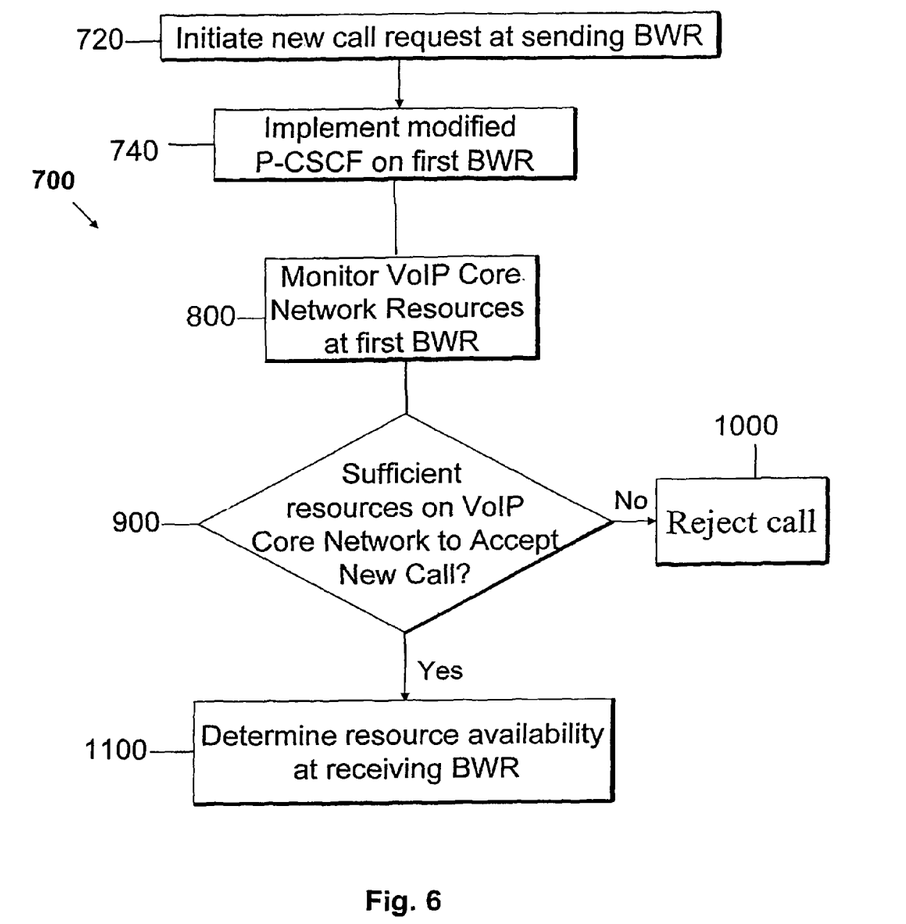
FIG. 6 is a flow diagram of an exemplary method for implementing a mobile-to-mobile call admission control process in accordance with one embodiment of the present invention.

When implementing a mobile-to-mobile call within network 30, not only the resources at the sending BWR 40, but also at the receiving BWR 44 must be verified. FIG. 6 illustrates an exemplary method for implementing a mobile-to-mobile ("M2M") call admission control ("CAC") process within network 30 using BWR 40 integrated with a modified P-CSCF 42. In most respects M2M CAC method 700 functions similarly to CAC method 100. In this situation, however, the resources must be monitored at both the sending BWR 40 as well as the receiving BWR 44.

A user 20 initiates a new call request at the sending BWR 40 (step 720), which in turn implements modified P-CSCF 42 (step 740). Sending BWR 40 monitors the available resources in network 20 as described previously (step 800) and determines whether the available network resources are sufficient to allow acceptance of the new call request (step 900). If the available network resources are not sufficient, the new call request is rejected (step 1000). If there are sufficient available network resources, the new call is accepted at the sending BWR 40, however, an additional check of the availability of network resources is similarly performed at the receiving BWR 40.

Only if there are also sufficient resources at receiving at receiving BWR 44 is the new call request completely accepted and the new call engaged. Otherwise, the new call request is rejected. The SIP CAC message is transmitted to user 20's wireless unit as described in conjunction with FIG. 4, by sending BWR 40 (or receiving BWR 44). Sending BWR 40 and receiving BWR 44 may be located within the same MSO 50 area, thus using the same backhaul link 52, or may be remote from each other, using different MSOs 50.

Figure 7:
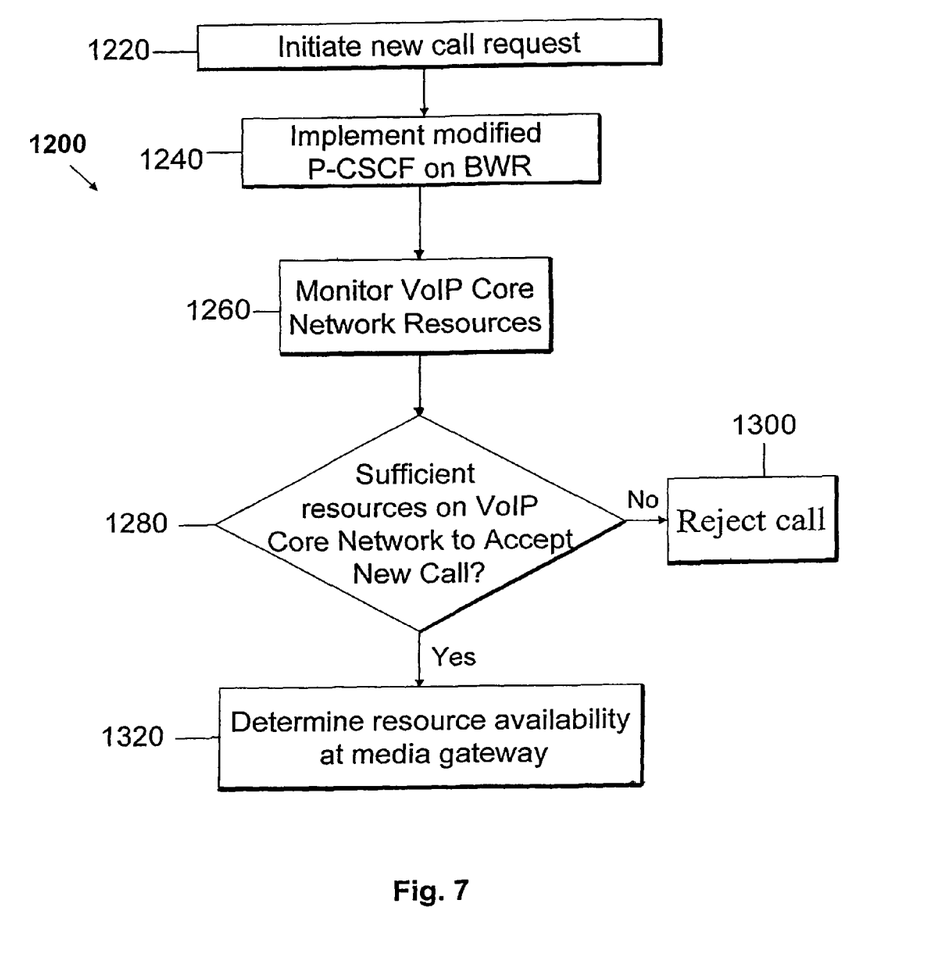
FIG. 7 is a flow diagram of an exemplary method for implementing a mobile-to-public switched telephone network call admission control process in accordance with one embodiment of the present invention.

FIG. 7 illustrates an exemplary method for implementing a mobile-to-public switched telephone network call admission control process using BWR 40 integrated with a modified P-CSCF 42. This scenario would occur when a user 20 wishes to place a call using network 30 to a landline user outside of network 30. Again, in most respects mobile-to-PSTN method 1200 functions similarly to CAC method 100. In this situation, however, the resources must be monitored at both the BWR 40 as well as a media gateway 80, which enables communication between network 30 and PSTN 90.

A user 20 initiates a new call request at the BWR 40 (step 1220), which in turn implements modified P-CSCF 42 (step 1240). Sending BWR 40 monitors the available resources in network 20 as described previously (step 1260) and determines whether the available network resources are sufficient to allow acceptance of the new call request (step 1280). If the available network resources are not sufficient, the new call request is rejected (step 1300). If there are sufficient available network resources, the new call is accepted at the BWR 40, however, an additional check of the availability of network resources is similarly performed at the media gateway 80.

Only if there are also sufficient resources at media gateway 80 is the new call request completely accepted and the new call engaged. Otherwise, the new call request is rejected. The SIP CAC message is transmitted to user 20's wireless unit as described in conjunction with FIG. 4, by BWR 40.

While the invention has been described in connection with various embodiments, it will be understood that the invention is capable of further modifications. This application is intended to cover any variations, uses or adaptations of the invention following, in general, the principles of the invention, and including such departures from the present disclosure as known, within the known and customary practice within the art to which the invention pertains.

What is claimed is:

1. A method for providing enhanced service in an IP-based core network having a collapsed wireless system architecture, the method comprising the acts of:
   modifying a proxy-call session control function for operation within a broadband wireless router in which the proxy-call session control function is integrated;
   monitoring the IP-based core network using the modified proxy call session control function to determine an amount of available resources in the IP-based core network; and
   based on the amount of available resources, either accepting a call or rejecting the call into the network.

2. The method of claim 1, wherein determining the amount of available resources in the IP-based core network further comprises the act of monitoring a number of calls in progress in the IP-based core network.

3. The method of claim 1, wherein determining the amount of available resources in the IP-based core network further comprises the act of determining a bandwidth availability in the IP-based core network at the broadband wireless router.

4. The method of claim 1, wherein determining the amount of available resources in the IP-based core network further comprises the act of determining an amount of bandwidth available on a backhaul link within the IP-based core network.

5. The method of claim 1, further comprising the act of rejecting admission of a new call into the IP-based core network where the amount of available resources in the IP-based core network is below a predetermined call admission threshold.

6. The method of claim 5, wherein the predetermined call admission threshold is dynamically determined based on the amount of available resources in the IP-based core network.

7. The method of claim 5, wherein rejecting admission of a call into the IP-based core network further comprises the act of generating a call admission control message, wherein the call admission control message is transmitted to a wireless unit, which originated the call, informing a user of the wireless unit that the call cannot be completed.

8. The method of claim 7, wherein generating the call admission control message further comprises the act of using the modified proxy-call session control function to send a session initiation protocol message to the wireless unit, the session initiation protocol message indicating that the call is rejected.

9. The method of claim 1, further comprising the act of accepting admission of the call into the IP-based core network where a quality of the call is such that the call can be supported by the amount of available resources in the IP-based core network.

10. The method of claim 9, wherein accepting admission of the call further comprises the act of using the modified proxy-call session control function to send a session initiation protocol message to a serving call session control function, the session initiation protocol message indicating that the call is accepted.

11. The method of claim 9, wherein the call having a lower quality is charged at a lower rate.

12. The method of claim 9, wherein the quality of the call is above a minimum acceptable quality.

13. A method for providing enhanced service in an IP-based core network having a collapsed wireless system architecture, the method comprising the acts of:
 modifying a proxy-call session control function for operation within a broadband wireless router in which the proxy-call session control function is integrated;
 monitoring the IP-based core network using the modified proxy call session control function to determine an amount of available resources in the IP-based core network; and
 adjusting a quality of at least one call-in-progress based on an amount of available resources in the IP-based core network.

14. The method of claim 13, wherein the quality of the at least one call-in-progress is adjusted using a session initiation protocol.

15. The method of claim 13, wherein adjusting the quality of the at least one call-in-progress further comprises the act of upgrading the quality to at most a maximum quality level that can be supported by the amount of available resources in the IP-based core network.

16. The method of claim 15, wherein a call having a higher quality is charged at a higher rate.

17. The method of claim 13, wherein adjusting the quality of the at least one call-in-progress further comprises the act of downgrading the quality to at least a minimum acceptable quality.

18. The method of claim 1, further comprising the act of allowing quality differentiation between user segments for at least one application.

19. The method of claim 18, wherein the act of allowing quality differentiation between user segments further comprises allowing the at least one application to adjust at least one of its bandwidth and quality of service requirements according to the amount of available resources in the IP-based core network.

20. The method of claim 18, wherein use of the at least one application by a user segment having a lower quality is charged at a lower rate.

* * * * *